United States Patent [19]

Parish

[11] 4,389,961
[45] Jun. 28, 1983

[54] SELF-COLLAPSIBLE, INFLATABLE DEVICE

[76] Inventor: John R. Parish, 2543 Evermur Dr., Dayton, Ohio 45414

[21] Appl. No.: 216,408

[22] Filed: Dec. 15, 1980

[51] Int. Cl.$^3$ .............................................. B63B 7/08
[52] U.S. Cl. ....................................... 114/345; 5/449; 52/2; 441/40; 441/66
[58] Field of Search ...................... 280/18; 5/449, 450, 5/453–458; 46/86, 87, 181; 441/40, 66; 114/345; 52/2; 410/119; 223/67

[56] References Cited

U.S. PATENT DOCUMENTS

| 2,826,523 | 3/1958 | Blaszkowski et al. | 52/2 X |
| 3,319,972 | 5/1967 | Gallaher | 280/18 |
| 3,426,115 | 2/1969 | Taber | 264/320 |

FOREIGN PATENT DOCUMENTS 428124 7/1967 Switzerland ............................. 5/450

Primary Examiner—Sherman D. Basinger
Attorney, Agent, or Firm—Biebel, French & Nauman

[57] ABSTRACT

A self-collapsible, inflatable device consists of a sheet made of a thermoplastic material having a memory set such that it forms into a coil when unrestrained and at least one inflatable member, semi-rigid when inflated and capable of being coiled when deflated, the inflatable member being mounted on a surface of the sheet which assumes a concave shape when the sheet is allowed to form into a coil. In one preferred embodiment the sheet includes upper and lower sheet members joined at their respective leading edges and the inflatable member is attached to the lower surface of the upper sheet and the upper surface of the lower sheet. The inflatable member and the upper and lower sheets are arranged such that the self-collapsible device coils itself when the inflatable member is deflated.

12 Claims, 10 Drawing Figures

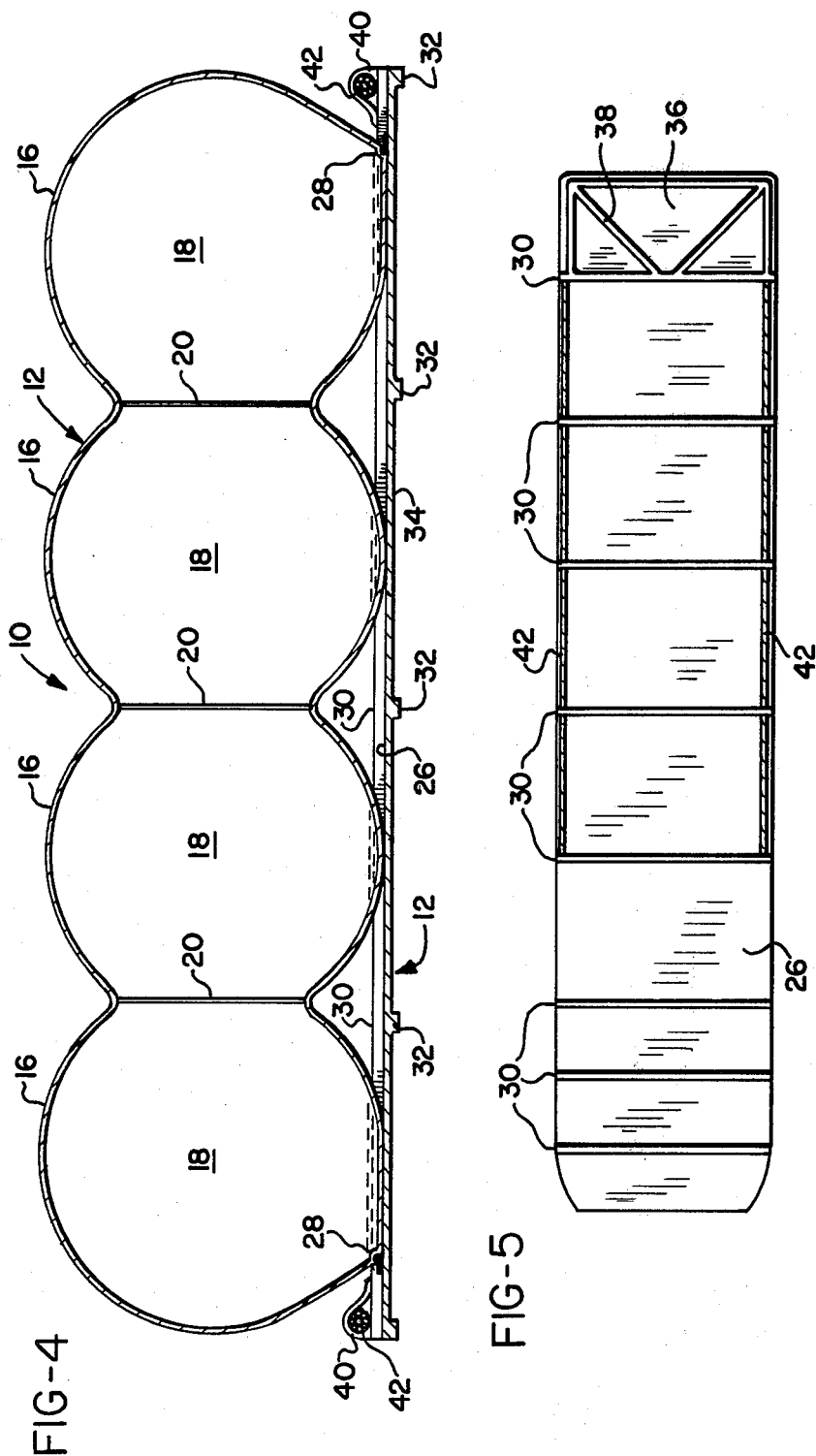

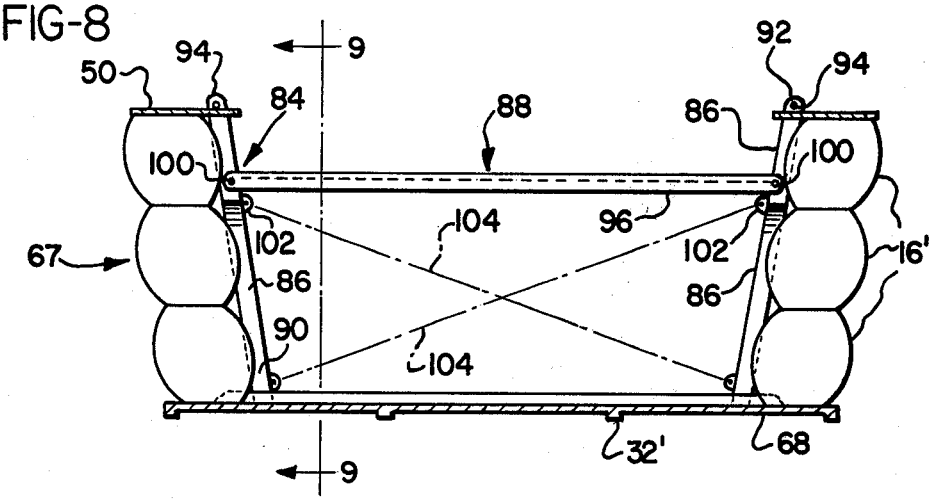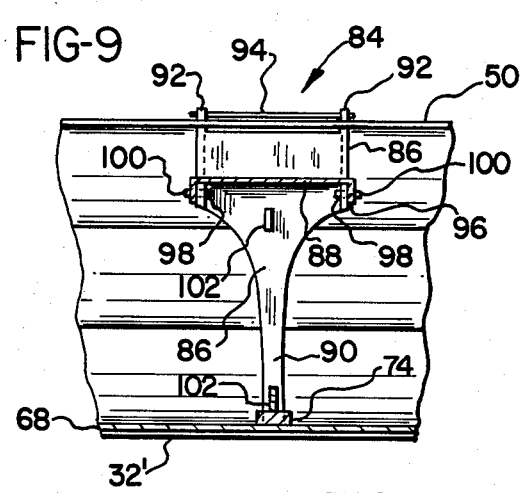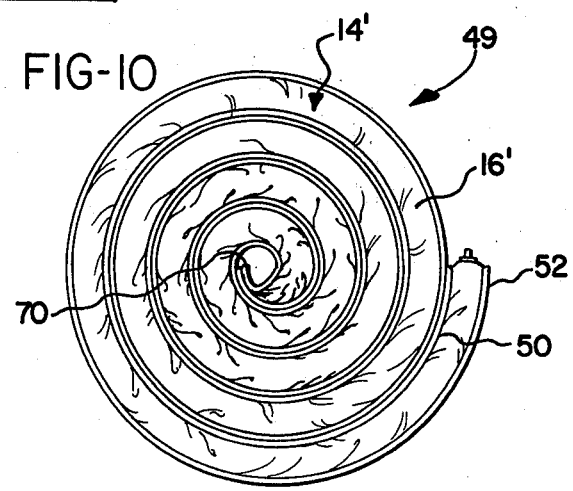

SELF-COLLAPSIBLE, INFLATABLE DEVICE

BACKGROUND OF THE INVENTION

1. Field of the Invention

This invention relates to inflatable devices and, more particularly, inflatable devices consisting of an inflatable member mounted to a rigid but self-coiling sheet.

2. Prior Art

Inflatable devices are popular because they are light, inexpensive, and they provide a cushioned support for the user. An additional advantage inherent in most inflatable devices is that the device becomes relatively compact and easy to store upon deflation. The inflatable portions of these devices usually consist of a plurality of tubes made of a relatively thin-walled flexible material, such as plastic or a polyester fabric coated with a plastic, joined together to form one or more chambers. A valve is fitted to a wall of one of the tubes and the entire inflatable portion may be inflated from this one valve. It is desirable to have an inflatable portion having relatively thin walls made of a flexible material because this reduces the overall weight of the device and provides an inflatable portion that is relatively easy to inflate. In some instances, the inflatable portion can be inflated by the lung power of the user of the device.

However, an inherent disadvantage in providing an inflatable portion having thin walls is that the walls are then subject to failure as a result of contact with the environment of the inflatable device. This is particularly true when the inflatable portion forms a part of a vehicle such as a toboggan or inflatable boat which moves and has a frictional engagement with relatively unyielding elements in its surroundings. Therefore, it is desirable to interpose a relatively rigid sheet between the inflatable portion and the environment to reduce the frictional contact of the inflatable portion and thereby reduce the likelihood of a puncture or failure by abrasion.

For example, U.S. Pat. No. 3,319,972 is directed to a collapsible sled having a head section composed of a stiff or rigid material and a flexible sheet extending rearward of the head section upon which an inflatable load supporting section is mounted. When the load supporting section is inflated, passengers on the toboggan are provided with a cushioned seat which absorbs shocks encountered while the toboggan is travelling. Upon deflation, the inflatable load supporting section and the flexible sheet upon which it is mounted may be rolled into a coil and placed inside the concavity of the rigid head section. A disadvantage inherent in this device is that the user must manually roll the load supporting section and flexible sheet into the desired coil.

Another example of an inflatable vehicle is disclosed in U.S. Pat. No. 3,432,182. This patent discloses an inflatable toboggan having a plurality of inflatable tubes interconnected to form a single chamber and joined at their peripheries by a rope or cable which serves as a handhold. However, this device lacks a rigid bottom sheet which would prevent the inflatable tubes from becoming worn or punctured by obstacles on the terrain along which the vehicle travels. Again, this device must be coiled manually for storage when deflated, a time-consuming procedure.

U.S. Pat. Nos. 3,199,888 and 3,140,878 are directed to toboggans having flexible bottom sheets but no inflatable members. Each of these patents discloses a device that can be coiled for storage by rolling the body of the toboggan about an axis which is normal to the longitudinal dimension of the toboggan. Although coilable for storage, these devices lack the cushioning benefits of an inflatable member. Also, each of these devices must be coiled by hand for storage.

Accordingly, there is a need for an inflatable device in which an inflatable member is mounted to a relatively rigid supporting sheet and which eliminates the need of being manually coiled upon deflation of the inflatable member.

SUMMARY OF THE INVENTION

The present invention provides an inflatable device which has the advantage of being self-collapsible. This property enables the invention to be deflated and coiled into a storage configuration without assistance by the user of the device. At the same time, the inflatable device of the present invention does not sacrifice the abrasion resistant qualities of the prior art inflatable devices for this self-coiling feature, so that it possesses a comparable useful life.

The present invention is a self-collapsible inflatable device which consists of a thin, relatively rigid sheet of a thermoplastic material having a memory set such that it forms into a coil when unrestrained and at least one inflatable member which is semi-rigid when inflated and capable of being coiled when deflated. The inflatable member preferably is mounted to the upper surface of the sheet by means of heat sealing, gluing, or sonic welding.

One embodiment of the invention consists of an inflatable toboggan. The inflatable member consists of a plurality of inflatable tubes which communicate with each other to form a continuous chamber. The tubes are arranged along the longitudinal dimension of a substantially rectangular thermoplastic sheet. The sheet is memory set such that the axis about which the coil forms when the sheet is unrestrained is normal to the longitudinal dimension of the sheet and tubes.

In this fashion, the sheet is uncoiled to form a substantially planar configuration as the tubes are inflated and assume their tubular shape. The inflatable member also includes a plurality of arcuate sections which extend between the leading edge of the sheet and the tubes. When these arcuate sections become inflated, they cause the portion of the sheet adjacent the leading edge to assume an arcuate shape which may serve as the head section of the inflatable toboggan. When the inflatable member is deflated, the tubes and arcuate sections no longer hold the sheet in a substantially planar configuration and allow it to coil itself and the inflatable member mounted to it into a compact storage configuration.

Such an inflatable toboggan may also include clip members which are formed on the upper surface of the sheet on either side of the tubes which serve as stays for securing a rope or similar article which is used as a handle. The leading edge of the sheet can be formed to include a folded end which can enclose a rope or similar article which serves as a steering means. In order to provide strength to the bottom sheet and to aid in the guiding of the toboggan, stiffening strips may be formed on the bottom surface of the sheet which extend parallel to the longitudinal dimension.

Another embodiment of the invention consists of an inflatable boat. The sheet consists of upper and lower sheet members, each having a leading edge, a trailing edge, a top surface and a bottom surface. These sheets are arranged so that the inflatable member is attached by the aforementioned means to the bottom surface of the upper sheet member and the top surface of the lower sheet member. The sheet members are substantially rectangular in shape and are heat set so that they coil about axes which are parallel to one another. The upper and lower sheets are joined by heat sealing, gluing, or sonic welding at their leading edges and the upper sheet defines a substantially rectangular opening therethrough.

In this embodiment the inflatable member consists of a plurality of inflatable tubes having a generally rectangular shape and stacked one upon the other in registry with the opening so that a recess is formed in the inflatable device extending from the upper sheet member to the top surface of the lower sheet member. In this fashion, by inflating the inflatable tubes, the upper and lower sheet members are forced to uncoil and assume a substantially planar configuration. Upon deflation, the upper and lower sheets begin to coil and thereby promote the rate at which the inflatable tubes deflat and cause the device to assume a coiled-for-storage configuration.

Such an embodiment is ideal for use as an inflatable boat. The lower sheet member preferably can be formed with a plurality of transverse ridges on its top surface, as well as longitudinal ridges formed on its bottom surface for strengthening the bottom sheet. The rear of the inflatable boat, which is the end opposite the joined leading edges of the upper and lower sheets, may also include additional raised reinforcing ridges in a triangular configuration.

In this embodiment, the upper sheet may include opposing brackets formed about the periphery of the opening, and the lower sheet may contain raised bosses to receive seat brackets which are spaced along the length of the boat. Bench-type seats may be suspended between opposing seat brackets and retained by bolts or other means which would permit the seats to be readily removed. In order to stiffen the sides of the boat, cables or other elastic means may be suspended in a criss-cross configuration between opposing brackets. Both the seat brackets and the bench seats themselves may be formed of a lightweight metal such as aluminum or of a sturdy reinforced plastic.

Accordingly, it is an object of this invention to provide a self-collapsible inflatable device which assumes a substantially planar configuration for use when it is inflated and coils itself into a storage configuration when deflated; to provide an inflatable device in which the inflatable member is shielded from abrasive elements by mounting it on a tough, flexible sheet; and to provide an inflatable device which is lightweight in construction and can be fabricated from relatively inexpensive components.

Other objects and advantages of the invention will be apparent from the following description, the accompanying drawings and the appended claims.

BRIEF DESCRIPTION OF THE DRAWINGS

FIG. 4 is a transverse, cross-sectional view of the embodiment of FIG. 1;

FIG. 5 is a plan view of the sheet of FIG. 1 in a planar configuration showing raised transverse reinforcing ribs;

FIG. 8 is a transverse, cross-sectional view taken at line 8—8 of FIG. 6;

FIG. 9 is a partly broken away side elevation, in section, of the second embodiment taken at line 9—9 of FIG. 8 to show a seat bracket; and FIG. 10 is a side elevation of the second embodiment deflated and coiled in a storage configuration.

DETAILED DESCRIPTION OF THE PREFERRED EMBODIMENTS

Figure 1:
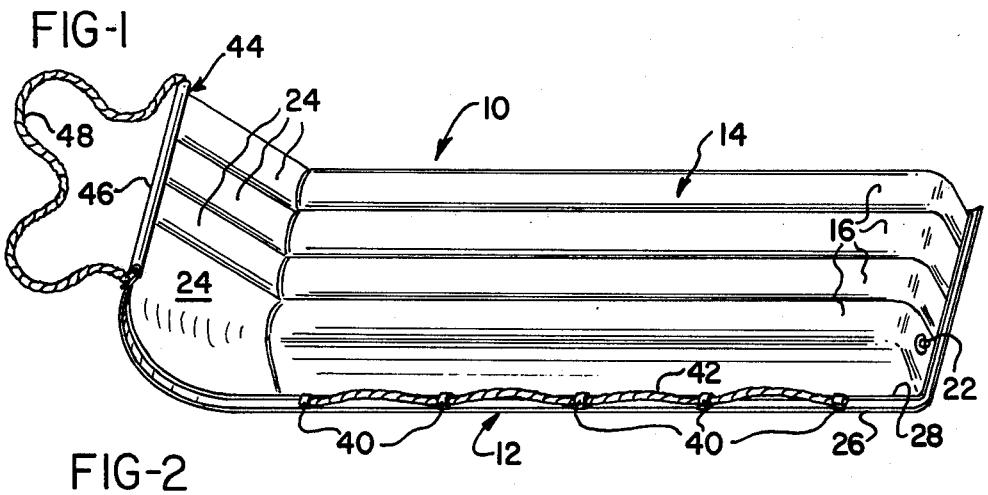
FIG. 1 is a perspective view of one embodiment of the invention.
Figure 2:
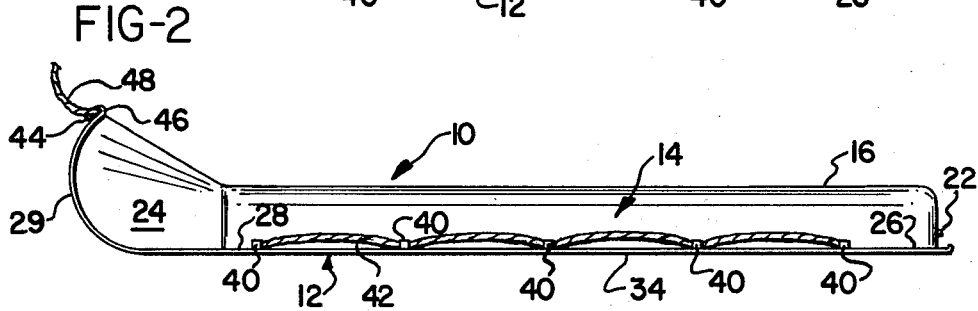
FIG. 2 is a side elevation of the embodiment of FIG. 1.

As shown in FIGS. 1 and 2, a preferred embodiment of the present invention may take the form of an inflatable toboggan, shown inflated and generally designated 10. The toboggan 10 consists of a sheet 12 on which is mounted an inflatable member 14. The sheet 12 preferably is approximately 1/16 inch thick and composed of thermoplastic material such as polyethylene, polypropylene, or polyester with fillers. Preferably, the sheet is heat set or "memory set" into a coiled configuration about an axis which is normal to its longitudinal dimension. The sheet 12 may be memory set into a coil by any conventional means, such as that described in U.S. Pat. No. 3,426,115.

The inflatable member 14 preferably is fabricated from a relatively thin fabric coated with urethane. The fabric may consist of a plastic material used for inflatable devices, such as nylon, propylene, polyethylene, or polyester fabric.

As shown in FIGS. 1, 2, and 4, the inflatable member 14 consists of a plurality of tubes 16 which communicate with each other in a manner well-knwon in the art to form a common interior chamber 18. As shown in FIG. 4, the tubes 16 are separated by interior walls 20 which have openings (not shown) so that the entire inflatable member 14 may be inflated from a single valve 22 formed in a selected tube 16, in a manner well-known in the art.

The inflatable member 14 includes arcuate members 24 which extend from the leading end of the tubes and are separated from them by similar walls (not shown) having openings so that the arcuate members form a part of the interior chamber 18.

The inflatable member 14 is mounted on the top surface 26 of the sheet 12 by conventional means such as heat sealing, gluing, or preferably sonic welding. The inflatable member 14 is attached about its outer periphery 28 to the top surface 26 so that, when inflated, the inflatable member causes the sheet to assume a substantially planar configuration, as shown in FIGS. 1 and 2. The arcuate members 24 are joined to the forward portion of the sheet 12 by similar methods so that it curves upward to form the head 29 of the toboggan 10.

As shown in FIGS. 4 and 5, in order to strength the sheet 12 of the toboggan 10, the sheet may be formed to include a plurality of raised transverse ribs 30 on its top surface 26 and raised longitudinal runners 32 which extend lengthwise along the bottom surface 34 of the sheet (FIG. 4). To strengthen the end portion 36 further, the top surface 26 preferably includes a raised triangular structure 38.

As a safety feature, the top surface 26 of the sheet 12 includes a number of loops 40 which are formed at the ends of the transversely extending raised ribs 30, through which is threaded a rope 42 or cable to serve as a handhold for the passengers. Similarly, the leading edge 44 of the sheet 12 includes a fold 46 through which is passed a section of a loop of rope 48 for conventional purposes.

Figure 3:
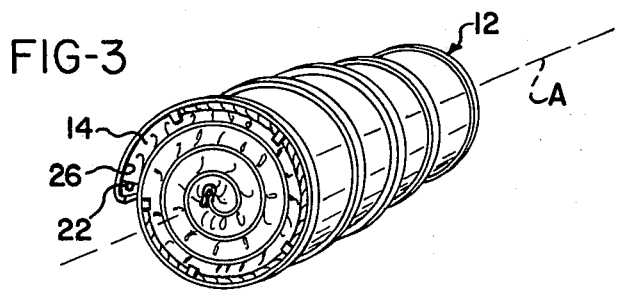
FIG. 3 is a perspective view of the embodiment of FIG. 1, deflated and coiled into a storage configuration.

As shown in FIG. 3, when it is desired to deflate the toboggan 10, the valve 22 is opened and the interior chamber 18 begins to empty itself of air. This deflation is promoted by the force of the sheet 12 as it assumes its memory set, coiled configuration. As the air leaves the interior chamber 18, the sheet 12 begins to coil about an axis A normal to the longitudinal dimension and eventually forms the coiled configuration shown in FIG. 3 for storage when the inflatable member 14 is substantially devoid of air. It should be noted that the entire sheet 12 consists of a memory set thermoplastic material, treated such that the top surface 26, which carries the inflatable portion 14, forms the inside of the coil. This protects the inflatable member 14 during storage.

Figures 6, 7:
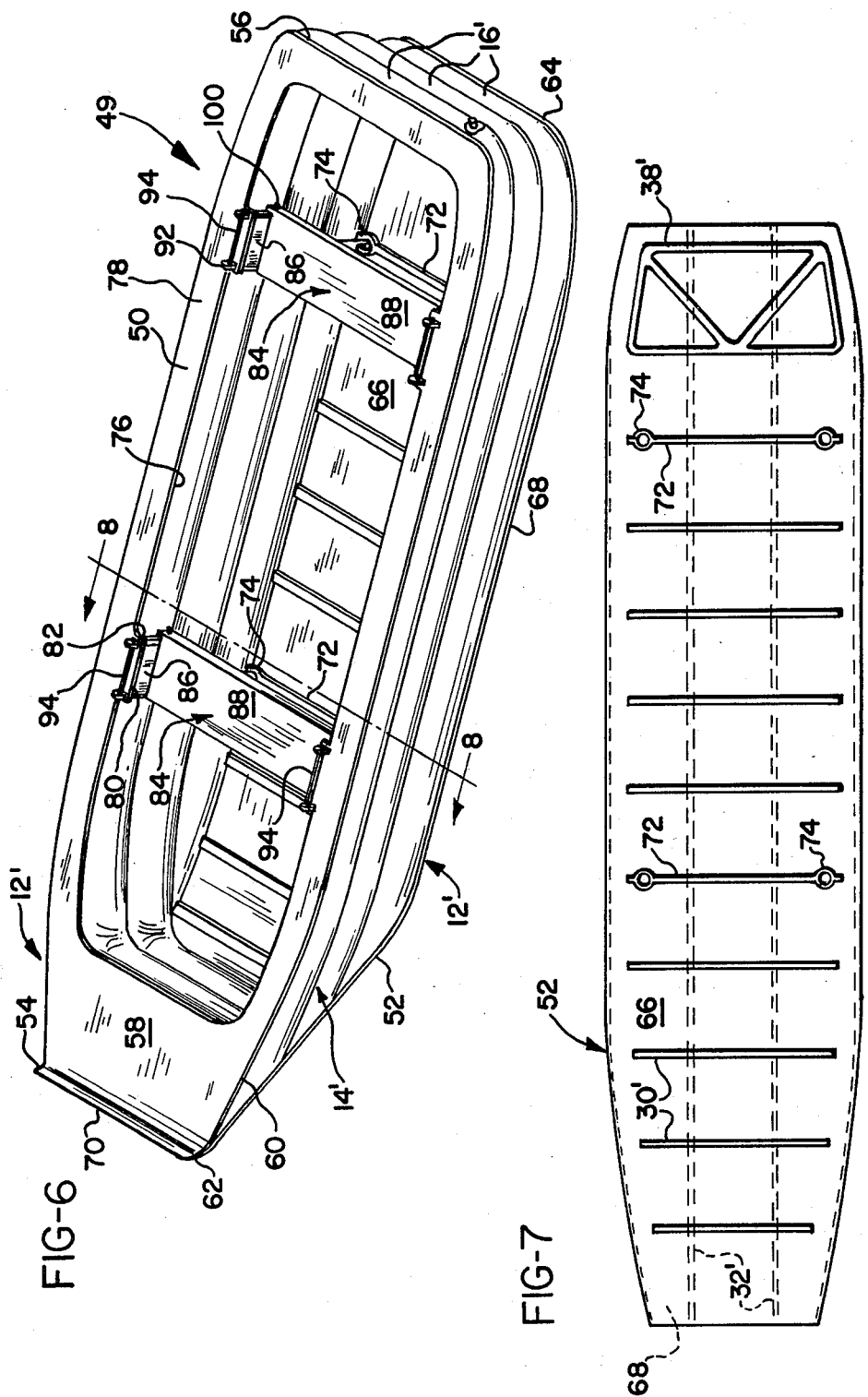
FIG. 6 is a perspective view of a second embodiment of the invention.
FIG. 7 is a plan view of the lower sheet of the embodiment of FIG. 6 in a planar configuration.

A second embodiment of the invention is an inflatable boat 49 shown inflated in FIG. 6. With this embodiment, the sheet 12' includes an upper sheet member 50 and a lower sheet member 52, each being memory set to coil about an axis normal to its longitudinal dimension. The upper sheet member includes a leading edge 54, trailing edge 56, top surface 58, and bottom surface 60. Similarly, the lower sheet member 52 includes a leading edge 62, trailing edge 64, top surface 66, and bottom surface 68.

The leading edges 54, 62, of the upper and lower sheet members 50, 52 respectively, are joined by heat sealing or other conventional means to form the bow 70 of the boat 49. The upper and lower sheet members 50, 52 are separated by an inflatable member 14' which is attached by sonic welding to the bottom surface 60 of the upper sheet member 50 and the top surface 66 of the lower sheet member 52, thereby forming the hull 67 of the boat 49. The inflatable member 14' consists, as seen in FIGS. 6 and 8, of tubes 16' defining stacked rectangles and joined together in a manner similar to the tubes of the toboggan. Thus, when inflated, the tubes 16' maintain the upper and lower sheet members 50, 52 in a substantially planar configuration, with the lower sheet member curving upwardly to join the upper sheet member and form the bow 70.

As shown in FIGS. 7 and 8, the lower sheet member 52 of the boat 49 is generally rectangular in shape and includes a plurality of transversely extending raised ribs 30' on the top surface 66, raised runners 32' on the bottom surface 68, and a triangular structure 38' on the rear portion of the top surface, all in a manner similar to that described for the previous embodiment shown in FIGS. 4 and 5. However, in this embodiment selected ribs 72 define raised bosses 74 which are used to receive seat brackets which subsequently will be described in detail.

The upper sheet member 50 defines a cut out 76 which is in registry with the tubes 16' and forms the gunwales 78 of the boat 49. The cut out 76 also includes opposing flanges 80 which are positioned directly above the raised bosses 74 and include slots 82 for receiving the seat structure of the boat.

As best shown in FIGS. 6, 8, and 9, the seat structure of the boat, generally designated 84, consists of pairs of opposing seat brackets 86 between which extend the bench portions 88. The seat brackets 86 are generally Y-shaped and have a stem 90 sized to be inserted into a raised boss 74, and a pair of knuckles 92 which extend upwardly through the slots 82. The knuckles 92 are held within the slots 82 by a rod 94 which extends between the knuckles. The bench portions 88 include a pair of knuckles 96 at each end which are positioned over holes 98 on either side of the seat bracket 86. The bench portions 88 are held in position by bolts 100, or other conventional means, which extends through the knuckles 96 and holes 98.

In order to reinforce the hull 67 of the boat 49, the seat brackets 86 may include eyes 102 so that a cable or suitable flexible member 104 may be extended in crisscross fashion between opposing seat brackets.

As shown in FIG. 10, when the inflatable member 14 is deflated, the upper and lower sheet members 50, 52 coil about their respective axes and the entire boat 49 assumes a coiled configuration for storage when the inflatable portion 14' is voided. In the storage configuration, the inflatable member is shielded by the lower sheet member 52.

There are several advantages inherent in the invention as shown by the above discussion of two of the preferred embodiments. The invention provides a self-collapsible, inflatable device which resists damage caused by puncturing and abrasion since the inflatable portion is mounted on a rigid sheet. This enables the inflatable portion to be made of relatively thin and lightweight material, thus reducing the overall weight and expense of the device.

However, the most important advantage of the invention is that it is capable of coiling itself into a storage configuration upon deflation which protects the inflatable member. The memory set imposed upon the sheet causes the sheet and inflatable portion to coil as the device deflates.

While the forms of apparatus herein described constitute preferred embodiments of this invention, it is to be understood that the invention is not limited to these precise forms of apparatus, and that changes may be made therein without departing from the scope of the invention. For example, the same principle can be used, without substantial modification, to form an air mattress for acquatic sport, or a self-coiling sleeping bag with an inflatable air cushion bottom.

What is claimed is:
1. A self-collapsible, inflatable device comprising:
   a sheet made of a thermoplastic material having a memory set such that it forms into a coil when unrestrained;
   at least one inflatable member, semi-rigid when inflated and becoming flaccid and capable of being coiled when deflated, said inflatable member including valve means which may be opened for selectively allowing the entrance or egress of a gas or a fluid to inflate or deflate said inflatable member;
   means for attaching said inflatable member to said sheet such that inflation of said inflatable member is sufficient to overcome said memory set and force said sheet and said inflatable member to assume a substantially uncoiled position and deflation of said inflatable member permits said memory set to cause said sheet and said inflatable member to assume a coiled position; and
   said memory set being sufficient to promote deflation of said inflatable member when said valve means is opened.

2. The inflatable device of claim 1 wherein said sheet includes a top surface which becomes concave and a bottom surface which becomes convex when said sheet is formed into a coil, and said inflatable member is attached to said top surface of said sheet.

3. The inflatable device of claim 1 wherein said inflatable member includes a plurality of inflatable tubes extending along said sheet in a direction substantially normal to an axis about which said sheet is coiled.

4. The inflatable device of claim 1 wherein said thermoplastic material is a polyolefin selected from the group consisting of polyethylene and polypropylene.

5. The inflatable device of claim 1 wherein said inflatable member is made of a urethane coated material selected from the group consisting of polypropylene, polyethylene, and polyester fabric.

6. The inflatable device of claim 1 wherein said means for attaching said inflatable member to said sheet is a weld formed by sonic welding.

7. The inflatable device of claim 1 wherein:
said sheet includes upper and lower sheet members, each of said sheet members having a leading edge, a trailing edge, a top surface and a bottom surface, said sheet members composed of a thermoplastic material having a memory set such that said sheet members form into coils when unrestrained, said top surfaces becoming concave and said bottom surfaces becoming convex when said sheet members are formed into a coil; and
said attaching means attaches said inflatable member to said bottom surface of said upper sheet member and said top surface of said lower sheet member.

8. The inflatable device of claim 7 wherein said upper sheet and said lower sheet members are joined together at least at said leading edges.

9. The inflatable device of claim 8 wherein said upper sheet member defines an opening therethrough, and said inflatable member includes a plurality of tubes formed into substantially rectangular shapes, and stacked one on top of another to be in registry with said opening, thereby forming the hull of an inflatable boat.

10. The inflatable device of claim 9 including removable seat structure attached to said upper and lower sheet members.

11. A self-collapsible, inflatable device comprising:
upper and lower sheet members, said upper sheet member having an opening therethrough, each of said sheet members having a leading edge, a trailing edge, a top surface and a bottom surface, said sheet members being joined together at least at said leading edges thereof and composed of a thermoplastic material having a memory set such that said sheet members form into coils when unrestrained, said top surfaces becoming concave and said bottom surfaces becoming convex when said sheet members are formed into a coil;
an inflatable member including a plurality of tubes formed into substantially rectangular shapes and stacked to be in registry with said opening to form the hull of an inflatable boat, said tubes being semi-rigid when inflated and becoming flaccid and capable of being coiled when deflated;
said tubes including valve means which may be opened for selectively allowing the entrance or egress of a gas or a fluid to inflate or deflate said tubes;
means for attaching said inflatable member to said bottom surface of said upper sheet member and said top surface of said lower sheet member; and
said memory set of said sheet members being sufficient such that, when said valve means is opened to allow egress of gas or fluid, said sheet members cause said inflatable member to deflate and to assume a coiled position, whereby said device is self-collapsible.

12. The inflatable device of claim 11 further comprising removable seat structure attached to said upper and lower sheet members.

* * * * *